United States Patent
Lee et al.

(10) Patent No.: US 9,012,051 B2
(45) Date of Patent: Apr. 21, 2015

(54) BATTERY PACK OF IMPROVED SAFETY

(71) Applicant: LG Chem, Ltd., Seoul (KR)

(72) Inventors: BumHyun Lee, Seoul (KR); Jin Kyu Lee, Daejeon (KR); DalMo Kang, Daejeon (KR); Jong Moon Yoon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/015,508

(22) Filed: Aug. 30, 2013

(65) Prior Publication Data

US 2014/0004397 A1    Jan. 2, 2014

Related U.S. Application Data

(63) Continuation of application No. PCT/KR2012/003156, filed on Apr. 25, 2012.

(30) Foreign Application Priority Data

May 23, 2011    (KR) .................. 10-2011-0048238

(51) Int. Cl.
*H01M 2/10*    (2006.01)
*H01M 2/12*    (2006.01)
*H01M 2/34*    (2006.01)
*H01M 10/0585*    (2010.01)

(52) U.S. Cl.
CPC .......... *H01M 2/1077* (2013.01); *H01M 2/1083* (2013.01); *H01M 2/1094* (2013.01); *H01M 2/1241* (2013.01); *H01M 2/345* (2013.02); *H01M 10/0585* (2013.01)

(58) Field of Classification Search
USPC .................................... 429/71, 100
See application file for complete search history.

(56) References Cited

U.S. PATENT DOCUMENTS 7,517,607 B2 *    4/2009    Kim ............................. 429/56
2006/0028171 A1    2/2006    Marraffa
(Continued)

FOREIGN PATENT DOCUMENTS

EP           2293361 A2    3/2011
KR    10-2008-0027504 A    3/2008
(Continued)

OTHER PUBLICATIONS

PCT/ISA/210—International Search Report mailed on Oct. 10, 2012, issued in PCT/KR2012/003156.

*Primary Examiner* — Cynthia H Kelly
*Assistant Examiner* — Monique Wills
(74) *Attorney, Agent, or Firm* — Birch, Stewart, Kolasch & Birch, LLP

(57) ABSTRACT

Disclosed is a battery pack including a battery module array including battery modules arranged in two or more rows, a pair of side support members (a front support member and a rear support member) configured to respectively support a front and a rear of the battery module array, lower end support members configured to support a lower end of the battery module array, two or more first upper mounting members coupled to upper ends of the side support members and to lower ends of the inverted battery modules, a second upper mounting member configured to vertically intersect the first upper mounting members, the second upper mounting member being coupled to upper ends of the first upper mounting members, and a rear mounting member located at a rear of the battery module array.

23 Claims, 8 Drawing Sheets

(56) References Cited

U.S. PATENT DOCUMENTS

2011/0020677 A1* 1/2011 Shin et al. ................ 429/71
2011/0104532 A1* 5/2011 Buck et al. ................ 429/82
2011/0189514 A1   8/2011 Lee et al.
2012/0082875 A1* 4/2012 Watanabe et al. ......... 429/71

FOREIGN PATENT DOCUMENTS

| KR | 10-2009-0131573 A | 12/2009 |
| KR | 10-2010-0000764 A | 1/2010 |

* cited by examiner

BATTERY PACK OF IMPROVED SAFETY

CROSS REFERENCE TO RELATED APPLICATIONS

This application is the Continuation of PCT/KR2012/003156 filed on Apr. 25, 2012, which claims priority under 35 U.S.C 119(a) to Patent Application No. 10-2011-0048238 filed in the Republic of Korea on May 23, 2011, all of which are hereby expressly incorporated by reference into the present application.

TECHNICAL FIELD

The present invention relates to a battery pack with improved safety and, more particularly, to a battery pack including a battery module array including battery modules arranged in two or more rows, a pair of side support members (a front support member and a rear support member) configured to respectively support a front and a rear of the battery module array, lower end support members configured to support a lower end of the battery module array, two or more first upper mounting members coupled to upper ends of the side support members and to lower ends of the inverted battery modules, a second upper mounting member configured to vertically intersect the first upper mounting members, the second upper mounting member being coupled to upper ends of the first upper mounting members, and a rear mounting member located at a rear of the battery module array, wherein at least one of the side support members is partially provided with a weak portion exhibiting low resistance to volume expansion to induce local deformation of the battery modules upon occurrence of swelling, thereby achieving interruption of electrical connection in the battery pack.

BACKGROUND ART

As mobile devices have been increasingly developed and the demand for such mobile devices has increased, the demand for secondary batteries has sharply increased as an energy source for the mobile devices. Among such secondary batteries is a lithium secondary battery having high energy density and discharge voltage, into which much research has been carried out and which is now commercialized and widely used.

A secondary battery has attracted considerable attention as an energy source for power-driven devices, such as an electric bicycle (E-bike), an electric vehicle (EV), and a hybrid electric vehicle (HEV), as well as an energy source for mobile wireless electronic devices, such as a mobile phone, a digital camera, a personal digital assistant (PDA), a portable multimedia player (PMP), and a laptop computer.

A small-sized battery pack, in which a battery cell is packed, is used for small-sized devices, such as a mobile phone and a digital camera. On the other hand, a middle or large-sized battery pack, in which a battery pack including two or more battery cells (hereinafter, occasionally referred to as a "multi-cell") connected to each other in parallel and/or in series is packed, is used for middle or large-sized devices, such as a laptop computer and an electric vehicle.

As previously described, a lithium secondary battery exhibits excellent electrochemical properties; however, the lithium secondary battery has low safety. For example, when abnormal operations, such as overcharge, overdischarge, exposure to high temperature, and an electrical short circuit, of the lithium secondary battery occur, decomposition of active materials and an electrolyte, which are components of the battery, is caused with the result that heat and gas are generated and the high-temperature and high-pressure condition caused by generation of the heat and the gas accelerates the above-mentioned decomposition. Eventually, a fire or explosion may occur.

For this reason, the lithium secondary battery is provided with a safety system, such as a protection circuit to interrupt electric current when the battery is overcharged or overdischarged or when overcurrent flows in the battery, a positive temperature coefficient (PTC) element whose resistance greatly increases so as to interrupt electric current when the temperature of the battery increases, and a safety vent to interrupt electric current or exhaust gas when pressure increases due to generation of the gas. In case of a small-sized cylindrical secondary battery, for example, the PTC element and the safety vent are usually disposed at the top of an electrode assembly (a generating element) having a cathode/separator/anode structure, which is mounted in a cylindrical container. In case of a small-sized prismatic or pouch-shaped secondary battery, on the other hand, the protection circuit module and the PTC element are usually mounted at the upper end of a prismatic container or a pouch-shaped case, in which the generating element is mounted in a sealed state.

The safety-related problem of the lithium secondary battery is even more serious for a middle or large-sized battery pack having a multi-cell structure. Since a plurality of battery cells is used in the multi-cell battery pack, abnormal operation of some of the battery cells may cause abnormal operation of the other battery cells with the result that a fire or explosion may occur, which may lead to a large-scale accident. For this reason, the middle or large-sized battery pack is provided with a safety system, such as a fuse, a bimetal, and a battery management system (BMS), to protect the battery cells from overcharge, overdischarge, and overcurrent.

However, as the lithium secondary battery is continuously used, i.e. as the lithium secondary battery is repeatedly charged and discharged, the generating element and electrical connection members are gradually degraded. For example, degradation of the generating element leads to decomposition of electrode materials and the electrolyte, by which gas is generated. As a result, the battery cell (the container or the pouch-shaped case) gradually swells. In the normal state of the lithium secondary battery, the safety system, i.e. the BMS, detects overdischarge, overcharge, and overcurrent of the battery pack to control/protect the battery pack. In the abnormal state of the lithium secondary battery, however, when the BMS does not operate, a possibility of the risk increases and it is difficult to control the battery pack in order to secure the safety of the battery pack. The battery pack is generally constructed to have a structure in which a plurality of battery cells is fixedly mounted in a predetermined case. As a result, the respective swelling battery cells are further pressurized in the restrictive case, whereby risk of a fire or explosion greatly increases under an abnormal operating condition of the battery pack.

In connection with this matter, FIG. 1 is a circuit diagram typically showing a conventional battery pack. Referring to FIG. 1, a conventional battery pack 900 includes a battery module assembly 910 including a plurality of battery modules electrically connected to each other, each of the battery modules including a plurality of battery cells or unit modules connected to each other in series while being mounted in a module case, a BMS 920 to detect information regarding an operation state of the battery module assembly 910 and to control the battery module assembly 910 based on the detected information, and a power switch unit (relay) 930 to perform connection or disconnection between the battery module assembly 910 and an external input and output circuit (inverter) 940 according to an operation command from the BMS 920.

The BMS 920 keeps the power switch unit 930 on during a normal operating condition of the battery module assembly 910 and, upon detecting abnormality of the battery module assembly, turns the power switch unit 930 off to stop charge and discharge operations of the battery module assembly 900. During malfunction or non-operation of the BMS 920, on the other hand, the BMS 920 does not perform any control operation with the result that the power switch unit 930 is kept on. Consequently, charge and discharge operations of the battery module assembly 910 are continuously performed even in the abnormal operation state of the battery pack.

Furthermore, in a case in which battery modules are arranged in two or more rows to constitute a battery pack, it is difficult to predict which row of the battery modules will be overcharged.

Therefore, there is a high necessity for technology that is capable of fundamentally securing safety of the battery pack while solving the above problems.

In addition, there is also a necessity for a battery pack of a specific structure in which the battery pack, including battery modules arranged in two or more rows to provide high output and large capacity, is protected from vibration and impact, thereby securing durability of the battery pack, and the battery pack is configured to have a compact structure.

DISCLOSURE

Technical Problem

The present invention has been made to solve the above problems and other technical problems that have yet to be resolved.

As a result of a variety of extensive and intensive studies and experiments, the inventors of the present application have found that, in a case in which a battery pack including battery modules arranged in two or more rows is configured such that at least one of side support members is partially provided with a weak portion exhibiting low resistance to volume expansion, when the battery modules expand due to abnormal operation, such as overcharge, overdischarge, and overcurrent, of the battery pack or due to deterioration of the battery pack caused by charge and discharge of the battery pack for a long period of time, stress generated from the battery modules due to expansion of the battery modules is concentrated at the weak portion such that the weak portion induces local deformation of the battery modules upon occurrence of swelling, thereby achieving interruption of electrical connection in the battery pack and thus securing safety of the battery pack to a desired level.

Therefore, it is an object of the present invention to provide a battery pack having a specific structure to improve safety.

It is another object of the present invention to provide a battery pack configured such that first upper mounting members, a second upper mounting member, and a rear mounting member are formed in the shape of a quadrangular pipe in vertical section, thereby minimizing deformation of the battery pack due to vibration and impact in a vertical direction.

It is a further object of the present invention to provide a battery pack configured such that battery modules are upwardly assembled to first upper mounting members and a second upper mounting member, which are quadrangular pipe structures, such that the weight of the battery pack is supported by the quadrangular pipe structures and the battery pack has a compact structure.

Technical Solution

In accordance with one aspect of the present invention, the above and other objects can be accomplished by the provision of a battery pack including (a) a battery module array including battery modules configured to have a structure in which battery cells or unit modules, each of which has two or more battery cells mounted therein, are stacked in an inverted state, the battery modules being arranged in two or more rows, (b) a pair of side support members (a front support member and a rear support member) configured to respectively support a front and a rear of the battery module array in a state in which the side support members are in tight contact with outermost battery modules of the battery module array, (c) lower end support members coupled to lower ends of the side support members to support a lower end of the battery module array, (d) two or more first upper mounting members coupled to upper ends of the side support members and to lower ends of the inverted battery modules, one end of each of the first upper mounting members being fastened to an external device, (e) a second upper mounting member configured to vertically intersect the first upper mounting members, the second upper mounting member being coupled to upper ends of the first upper mounting members, opposite ends of the second upper mounting member being fastened to the external device, and (f) a rear mounting member located at a rear of the battery module array, opposite ends of the rear mounting member being fastened to the external device, wherein at least one of the side support members is partially provided with a weak portion exhibiting low resistance to volume expansion to induce local deformation of the battery modules upon occurrence of swelling, thereby achieving interruption of electrical connection in the battery pack.

In the battery pack including the battery modules arranged in two or more rows, the battery modules are expanded by swelling of the battery cells due to an abnormal operation, such as overcharge, overdischarge, or overcurrent, of the battery pack or due to degradation of the battery pack caused by the charge and discharge of the battery pack for a long period of time, as previously described, and such expansion of the battery modules causes combustion and explosion of the battery pack.

For this reason, the battery pack according to the present invention is configured such that the weak portion exhibiting low resistance to volume expansion upon occurrence of swelling is partially formed at the at least one of the side support members disposed in tight contact with the outermost battery modules. Consequently, when swelling exceeds a predetermined value, e.g., a limit value, expansion stress is concentrated at the weak portion formed at the at least one of the side support members with the result that the weak portion is physically deformed and eventually ruptures. Through such rupture of the weak portion, the electrical connection in a corresponding one of the outermost battery modules is interrupted and, therefore, charge and discharge operations are stopped with the result that further swelling of the battery modules is restrained. Consequently, combustion or explosion of the battery pack is prevented, thereby greatly improving safety of the battery pack.

In addition, it is possible to secure safety of the battery pack upon occurrence of swelling by the provision of only the structure of a corresponding side support member at which the weak portion is formed, without additional provision of an electrical device, such as a sensor or a relay. Furthermore, this structure uses increase of pressure to achieve interruption of electric connection in the battery pack instead of using an electrical signal as in the conventional art with the result that operational reliability of the battery pack according to the present invention is very high. In a state in which the swelling phenomenon does not occur, the side support members improve coupling between the battery modules, whereby it is possible to securely maintain the structure of the battery pack under impact or vibration.

Moreover, in the battery pack according to the present invention, the side support members respectively support the front and the rear of the battery module array with the result that it is possible to securely increase bending stiffness of the lower end support members coupled to the lower ends of the side support members and to sufficiently secure structural reliability of the entirety of the battery pack against vertical vibration.

In addition, opposite ends of the rear mounting member and the second upper mounting member and one end of each of the first upper mounting members are fastened to the external device with the result that it is possible to easily and stably mount the battery pack to the external device even in a case in which the battery pack is located lower than a position at which the battery pack is fastened to the external device.

Moreover, the battery modules, which are configured to have a structure in which unit modules are stacked in an inverted state, are arranged in two or more rows with the result that it is possible to supply electricity of high output and large capacity as compared with a conventional battery pack having one battery module.

For reference, in this specification, the side support members may be referred to as a 'front support member' configured to support the front of the battery module array and a 'rear support member' configured to support the rear of the battery module array as necessary. In addition, in this specification, directions may be expressed using terms 'forward,' 'backward,' 'left,' 'right,' 'upward,' and 'downward' on the basis of a state in which the battery modules are viewed facing the front support member disposed in tight contact with the front of the battery module array.

Preferably, each of the battery cells is a plate-shaped battery cell, which provides a high stack rate in a limited space. For example, each of the battery cells may be configured to have a structure in which an electrode assembly is mounted in a battery case formed of a laminate sheet.

Specifically, each of the battery cells is a pouch-shaped secondary battery in which an electrode assembly of a cathode/separator/anode structure is disposed in a battery case together with an electrolyte in a sealed state. For example, each of the battery cells may be a plate-shaped secondary battery configured to have an approximately hexahedral structure having a small thickness to width ratio. Generally, the pouch-shaped secondary battery includes a pouch-shaped battery case. The battery case is configured to have a laminate sheet structure in which an outer coating layer formed of a polymer resin exhibiting high durability, a barrier layer formed of a metallic material blocking moisture or air, and an inner sealant layer formed of a polymer resin that can be thermally welded are sequentially stacked.

In a case in which the battery modules are arranged in two or more rows, it is difficult to predict which row of the battery modules will be overcharged. Preferably, therefore, the weak portion is formed at at least one of the side support members per unit row of the battery modules. For example, the weak portion may include weak portions respectively formed on the front support member and the rear support member in a symmetrical fashion, weak portions formed on the front support member per unit row of the battery modules, or weak portions formed on the rear support member per unit row of the battery modules.

Specifically, in a case in which the battery module array is configured such that the battery modules are arranged in two rows, the weak portions formed on the front support member and/or the rear support member may induce local deformation of the outermost battery modules per unit row of the battery modules upon occurrence of swelling, thereby achieving interruption of electrical connection in the battery pack.

That is, in a case in which the weak portions are respectively formed on the front support member and the rear support member in a symmetrical fashion, the battery modules having swelled due to overcharge of the battery modules protrude outward in opposite directions, thereby securing desired safety.

On the other hand, in a case in which the weak portions are formed on the front support member per unit row of the battery modules or in a case in which the weak portions are formed on the rear support member per unit row of the battery modules, the battery modules having swelled due to overcharge of the battery modules protrude outward in the same direction, thereby securing desired safety.

In addition, the front support member or the rear support member is formed as an integrated body to support the front or the rear of the battery modules arranged in two or more rows with the result that it is possible for the weak portions of the front support member and/or the rear support member to prevent overcharge of every unit row of the battery modules constituting the battery module array.

Preferably, the weak portion is formed at a region corresponding to or adjacent to a series connection region of a corresponding one of the outermost unit modules so as to maximize the effect of interrupting electric connection in the battery pack. Upon swelling of the battery cells, therefore, internal pressure of the battery cells is concentrated at the series connection region of the outermost battery module, thereby more easily performing a process of interrupting electrical connection in the battery pack.

The weak portion is not particularly restricted as long as the weak portion has a structure that can be easily deformed according to volume expansion due to occurrence of swelling. For example, the weak portion may include a cutout portion through which the series connection region of the battery module is opened.

The cutout portion is formed at a corresponding one of the side support members such that a series connection region between the battery modules, a series connection region between the battery cells of each of the battery modules, a series connection region between the unit modules of each of the battery modules, or a series connection region between the battery cells is opened.

The series connection region is a region where electrode terminals are connected to each other in series. The series connection region may be electrode terminals connected to each other or a connecting member, such as a wire or a bus bar, to interconnect the electrode terminals.

Upon occurrence of swelling, therefore, the series connection region protrudes through the open cutout portion of the side support member. During such deformation, the series connection region ruptures, thereby achieving interruption of electrical connection in the battery pack.

It is sufficient for the series connection region exposed through the cutout portion to have a size to cause a desired short circuit upon occurrence of swelling.

Therefore, the size of the cutout portion of the side support member is also decided based on the above-defined size. For example, the cutout portion may have a size equivalent to 10 to 80% the surface area of the side support member. However, if the size of the cutout portion is too small on the basis of the surface area of the side support member, it may be difficult to induce deformation of the series connection region due to volume expansion of the battery module. On the other hand, if the size of the cutout portion is too large, it may be difficult to maintain strength necessary to protect the battery module array from external force. More preferably, a region at which the cutout portion is formed has a size equivalent to 20 to 70% the surface area of the side support member.

In a preferred example, the battery modules constituting the battery pack according to the present invention may be fixed to maintain a stacked state of the battery cells or the unit modules even when volume of the battery modules changes during charge and discharge of the battery modules, expansion stress generated from the battery cells due to swelling of the battery cells may be concentrated at an electrode terminal connection region between the battery cells or the unit modules, and the electrode terminal connection region may be configured to have a structure having low resistance to volume expansion such that the electrode terminal connection region ruptures when swelling exceeds a predetermined value, thereby achieving interruption of electrical connection in the battery pack.

Consequently, the battery modules are configured to have a structure in which the electrode terminal connection region between the battery cells or the unit modules has low resistance to volume expansion of the battery cells or the unit modules upon swelling of the battery cells or the unit modules. When swelling exceeds a predetermined value, i.e., a limit value, therefore, expansion stress is concentrated at the electrode terminal connection region with the result that the electrode terminal connection region is physically deformed and thus easily ruptures.

This structure is a double safety structure in which the weak portion is formed at the side support member and, in addition, the weak structure is formed at the electrode terminal connection region, thereby further improving safety of the battery pack.

In this structure, the battery cells or the unit modules may be surrounded by a high-strength case and the electrode terminal connection region configured to be ruptured upon excessive swelling of the battery cells may be opened or have a notch formed at the case.

That is, the unit modules may be manufactured such that a portion of the electrode terminal connection region has a structure of low resistance to expansion stress, such as an open structure or a structure having a notch, whereby excessive expansion stress caused upon swelling of the battery cells is concentrated at the open region or the notch region of the electrode terminal connection region.

As a concrete example of the above structure, each of the unit modules may include battery cells configured such that electrode terminals of the battery cells are connected to each other in series and a connection portion between the electrode terminals is bent such that the battery cells are stacked; and a pair of high-strength cell covers configured to be coupled to each other such that the cell covers can cover outer surfaces of the battery cells excluding the electrode terminals and one of the cell covers may be provided at a region thereof adjacent to the electrode terminal connection region with a cutout portion or a notch portion formed in a shape to induce local deformation of the battery cells during swelling.

For example, the battery cells may be covered by high-strength cell covers, made of synthetic resin or metal, to constitute a unit module. The high-strength cell covers serve to protect the battery cells, which exhibit low mechanical strength and, at the same time, to restrain the change in repetitive expansion and contraction of the battery cells during charge and discharge of the battery cells, thereby preventing separation between sealing regions of the respective battery cells. A desired-shaped cutout portion or a desired-shaped notch portion may be formed at a portion of one of the cell covers adjacent to the electrode terminal connection region such that expansion stress caused by swelling of the battery cells is easily concentrated at the cutout portion or the notch portion of the cell cover.

For example, each of the battery modules may include a plurality of unit modules, each of which includes plate-shaped battery cells each having electrode terminals formed at the front and rear sides of a battery case. In this case, the unit modules may be mounted in the battery case in a state in which the unit modules are erected in the lateral direction while being spaced a predetermined distance from each other such that a coolant can flow to cool the unit modules.

In the above structure, the cutout portion or the notch portion may be formed at a corresponding one of the cell covers of each of the outermost unit modules. Consequently, expansion stress of the battery cells due to abnormal operation of the battery cells is concentrated at the cutout portion or the notch portion formed at one of the cell covers of the outermost unit module with the result that the electrode terminal connection region of the outermost unit module ruptures, whereby electrical connection for charging and discharging is easily interrupted.

The size of the cutout portion or the notch portion may be changed depending upon the rupture setting conditions of the electrode terminal connection region. Preferably, the size of the cutout portion or the notch portion is set such that the electrode terminal connection region is ruptured when volume expansion corresponding to 1.5 to 5 times the thickness of each of the battery cells is caused by swelling of the battery cells. Such a setting range may be changed based on a desired safety test standard of the battery module. However, if the size of the of the cutout portion or the notch portion is too large, mechanical strength of the battery cells achieved by the cell covers may decrease and expansion of the battery cells may not be properly restrained under normal operating conditions. Therefore, it is necessary to set the size of the cutout portion or the notch portion within an appropriate range in consideration of the above-mentioned requirements.

The shape of the notch portion is not particularly restricted as long as the notch portion is formed at a region of a corresponding one of the cell covers adjacent to the electrode terminal connection region. For example, the notch portion may be formed in a straight shape.

In a preferred example, the first upper mounting members, the second upper mounting member, and the rear mounting member may be formed in the shape of a quadrangular pipe in vertical section.

Since the battery pack according to the present invention is configured such that the first upper mounting members and the second upper mounting member are formed in the shape of a quadrangular pipe in vertical section as described above, it is possible to minimize deformation of the battery pack due to vibration and impact using the quadrangular pipe having a high moment of inertia.

The quadrangular pipe may be formed in the shape of a hollow square bar or a solid square bar. Preferably, the quadrangular pipe is formed in the shape of the hollow square bar.

In a case in which the quadrangular pipe is formed in the shape of the hollow square bar or the solid square bar, the quadrangular pipe exhibits a higher inertia moment value than a conventional frame manufactured by bending a sheet into a predetermined shape or formed in an I shape, whereby the battery pack has improved resistance to vibration. The term 'square bar shape' used in the above description should be interpreted as a concept including an angled corner shape, a round corner shape, a shape having one or more straight sides, and a gently bent shape as well as a square shape.

In order to disperse pressure (bending load) from the battery modules and the lower end support members, each of the side support members is preferably configured to have a structure including a main body contacting a corresponding one of the outermost battery modules of the battery module array; an upper end wall and a lower end wall protruding outward from an outer circumference of the main body; and a pair of side walls. In the above description, the term 'outward' means a direction opposite to the pressure, i.e. a direction opposite to a direction in which the battery modules and the lower end support members are located on the basis of the main body of each of the side support members.

In the battery pack according to the present invention, therefore, the battery modules, which are erected in the inverted state in a state in which the lower ends of the battery modules are coupled to the first upper mounting members, are supported by the side support members in tight contact and the side support members are supported by the lower end support members. Consequently, movement and swelling of the battery modules in a thickness direction of the unit modules constituting each of the battery modules are prevented, thereby improving safety of the battery modules and effectively preventing deterioration in performance of the battery module.

In a preferred example of the above structure, the upper end wall of each of the side support members may be coupled to the first upper mounting members by welding or bolting.

Meanwhile, the shape of the side support members is not particularly restricted as long as the side support members easily support the front and the rear of the battery module array. For example, the side support members may be formed in a rectangular shape when viewed from above.

The battery pack may further include a lower plate mounted to lower parts of the lower end support members in a state in which opposite ends of the lower plate are coupled to the side support members. Consequently, it is possible to double prevent downward movement of the battery module array when external force is applied to the battery pack together with the lower end support members.

In a preferred example, in a case in which the battery modules are arranged in two rows to constitute the battery module array, the lower end support members may include four members to respectively support opposite lower ends of the battery modules.

The structure of the first upper mounting members is not particularly restricted as long as the lower ends of the inverted battery modules can be easily mounted to the first upper mounting members. For example, the first upper mounting members may include two end members respectively coupled to opposite ends of the battery module array and one middle member coupled to the middle of the battery module array, thereby uniformly supporting the weight of the battery module array.

Each of the first upper mounting members may have one end at which each of the first upper mounting members is fastened to the external device and the end of each of the first upper mounting members may be bent upward by the height of the second upper mounting member coupled to the upper ends of the first upper mounting members such that the end of each of the first upper mounting members and the top of the second upper mounting member have the same height.

According to circumstances, the battery pack may further include an upper plate mounted between the battery module array and the first upper mounting members to reinforce the top of the battery module array.

In an example of the above structure, the battery module array may be coupled to the upper plate fixed to the lower ends of the first upper mounting members such that the weight of the battery module array is supported by the first upper mounting members.

In another example, regions of the upper plate corresponding to the first upper mounting members may be depressed to lower the overall height of the battery pack.

Meanwhile, the battery pack generally includes an electrical wiring structure. Consequently, the lower plate may extend to the rear of the rear mounting member to secure a space through which a wire, e.g. an electric wire, extends.

According to circumstances, the other end of each of the first upper mounting members may be coupled to the upper end of the rear mounting member to improve coupling between the first upper mounting members and the rear mounting member.

In another example, a reinforcement bracket may be further coupled to the upper ends of the first upper mounting members in parallel to the second upper mounting member to further reinforce the coupling structure between the first upper mounting members and the second upper mounting member.

Meanwhile, a U-shaped bracket configured to fix a safety plug may be further mounted to the upper end of at least one of the first upper mounting members.

In an example, the structure of the rear mounting member is not particularly restricted as long as the rear mounting member easily surrounds opposite side surfaces and the bottom of a cooling fan mounted at the rear of the battery module array. Preferably, the rear mounting member is configured to have a U-shaped frame structure.

In another example, the opposite ends of the rear mounting member may be bent in parallel to the second upper mounting member such that the rear mounting member is easily coupled to the external device and the rear mounting member may be provided at the bent regions thereof with fastening holes.

In accordance with another aspect of the present invention, there is provided an electric vehicle, a hybrid electric vehicle, or a plug-in hybrid electric vehicle using the battery pack with the above-stated construction as a power source, having a limited installation space, and exposed to frequent vibration and strong impact.

Of course, the battery pack used as the power source of the vehicle may be combined and manufactured based on desired output and capacity.

In this case, the vehicle may be an electric vehicle, a hybrid electric vehicle, or a plug-in hybrid electric vehicle wherein the battery pack is installed in the lower end of a trunk of the vehicle or between a rear seat and the trunk of the vehicle.

The electric vehicle, the hybrid electric vehicle, or the plug-in hybrid electric vehicle using the battery pack as the power source thereof are well known in the art to which the present invention pertains and, therefore, a detailed description thereof will be omitted.

DESCRIPTION OF DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 1:
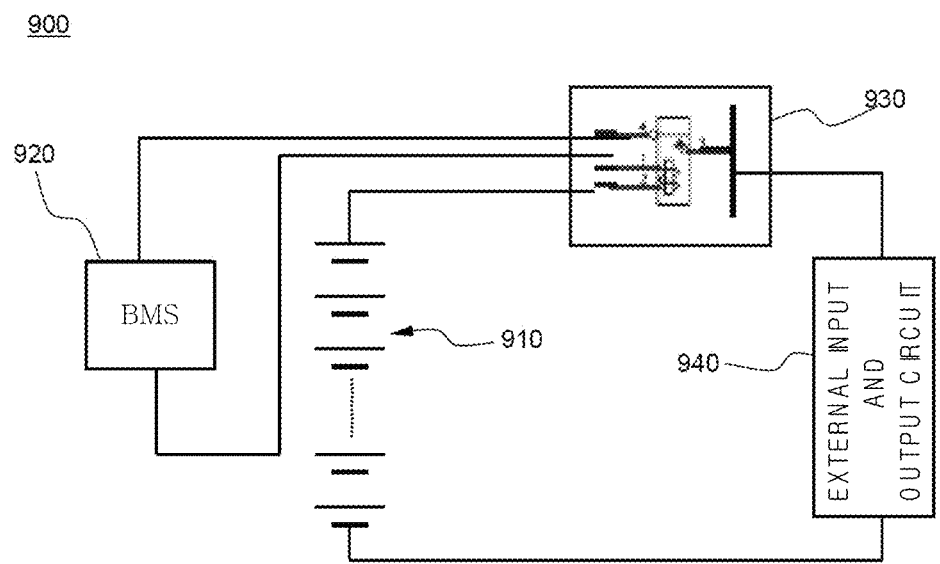
FIG. 1 is a circuit diagram of a conventional battery pack.
Figure 2:
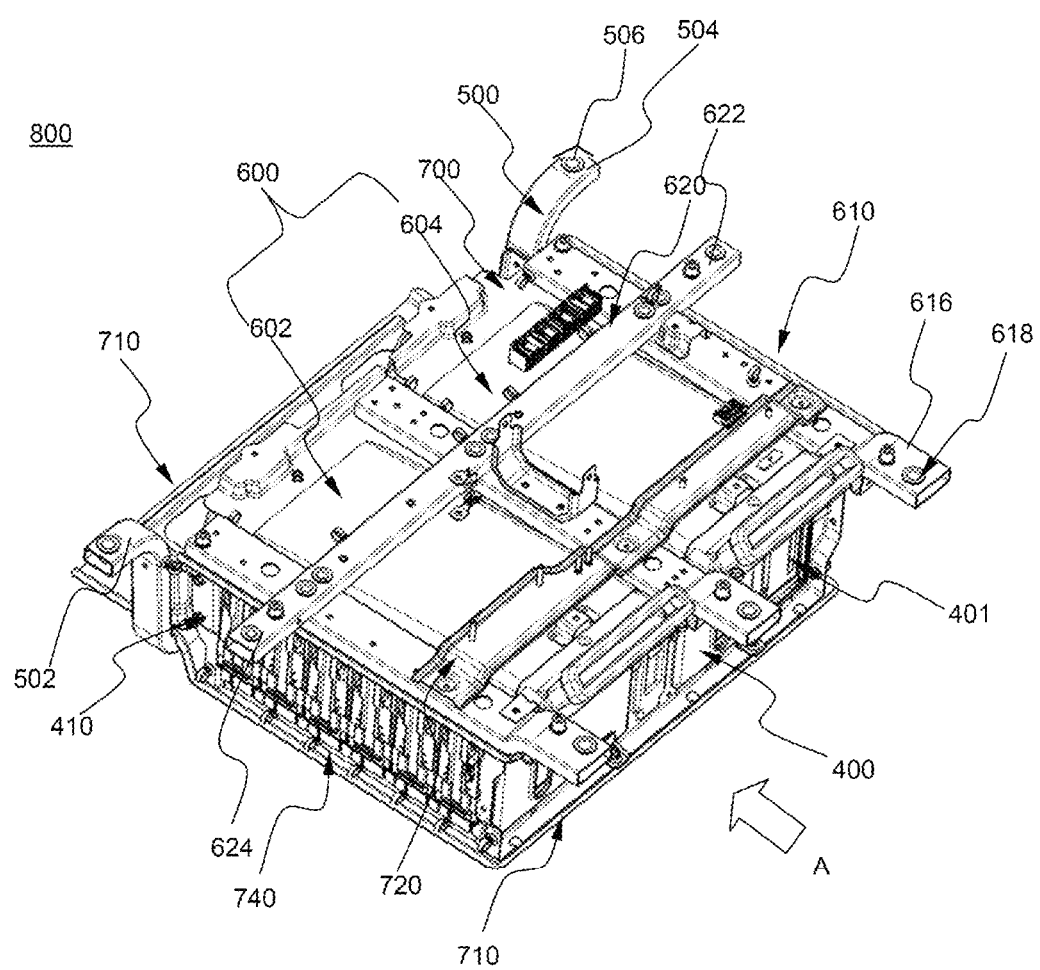
FIG. 2 is a perspective view showing a battery pack according to an embodiment of the present invention.
Figure 3:
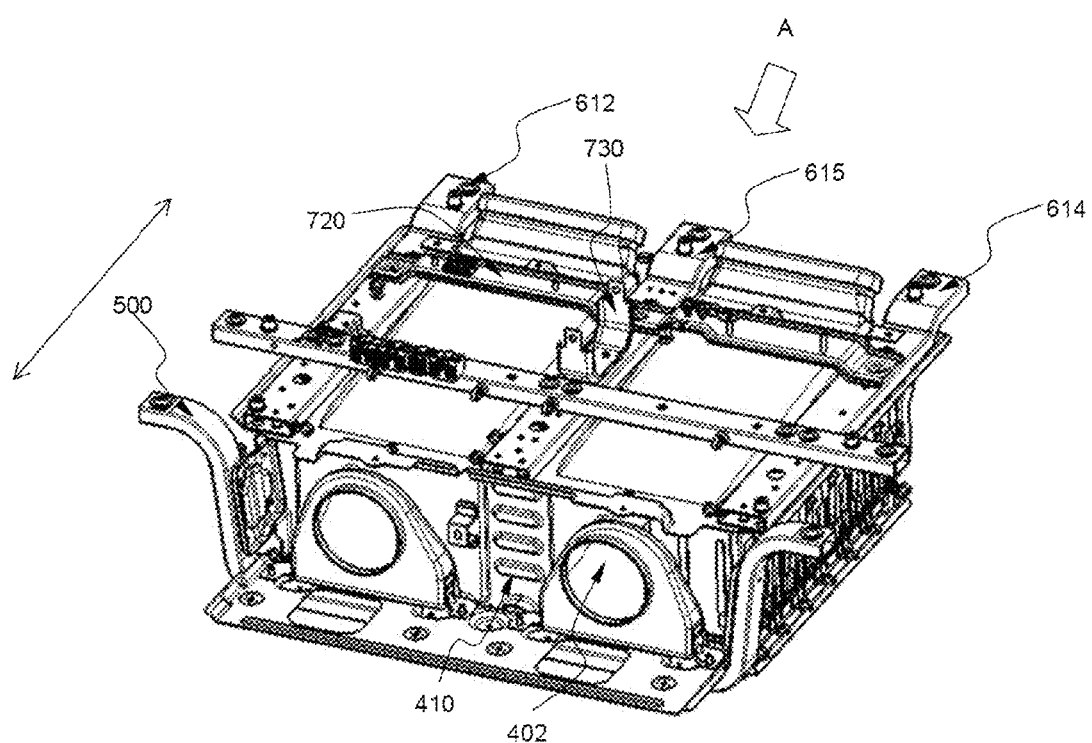
FIG. 3 is a perspective view showing the battery pack of FIG. 2 when viewed from behind.

FIG. 2 is a perspective view typically showing a battery pack according to an embodiment of the present invention and FIG. 3 is a perspective view typically showing the battery pack of FIG. 2 when viewed from behind.

Figure 4:
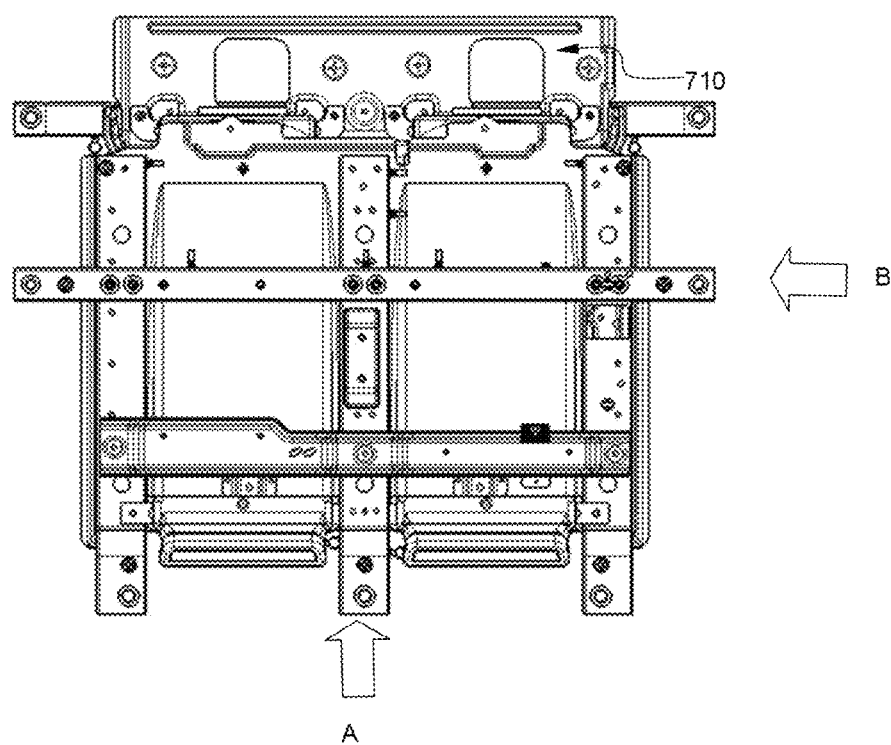
FIG. 4 is a plan view showing the battery pack of FIG. 2 when viewed from above.

In addition, FIG. 4 is a plan view typically showing the battery pack of FIG. 2 when viewed from above.

Referring to these drawings, a battery pack 800 includes a battery module array 600, a pair of side support members, i.e. a front support member 400 and a rear support member 410, lower end support members 740, three first upper mounting members 610, a second upper mounting member 620, and a rear mounting member 500.

In addition, weak portions 401 and 402 exhibiting low resistance to volume expansion are respectively formed on the front support member 400 and the rear support member 410 in a symmetrical fashion to induce local deformation of battery modules upon occurrence of swelling, thereby achieving interruption of electrical connection in the battery pack.

Alternatively, both the weak portions 401 and 402 may be formed on the front support member 400 per unit row of battery modules 602 and 604 or may be formed on the rear support member 410 per unit row of the battery modules 602 and 604.

The weak portions 401 and 402 may be cutout portions through which series connection regions of the outermost battery modules are opened. A region at which each cutout portion is formed has a size equivalent to about 20% the surface area of the front support member 400 or the rear support member 410.

In the battery module array 600, the battery modules 602 and 604, which are configured to have a structure in which unit modules are stacked in an inverted state, are arranged in two rows. The front support member 400 and the rear support member 410 respectively support the front and the rear of the battery module array 600 in a state in which the front support member 400 and the rear support member 410 are in tight contact with the outermost battery modules of the battery module array 600.

The lower end support members 740 are coupled to the lower ends of the front support member 400 and the rear support member 410 to support the lower end of the battery module array 600.

In addition, the first upper mounting members 610 are coupled to the upper ends of the front support member 400 and the rear support member 410 and to the lower ends of the inverted battery modules 602 and 604. Each of the first upper mounting members 610 is fastened to an external device via a fastening hole 618 formed at one end 616 thereof.

The second upper mounting member 620 vertically intersects the first upper mounting members 610. The second upper mounting member 620 is coupled to the upper ends of the first upper mounting members 610. The second upper mounting member 620 is fastened to an external device (for example, a vehicle) through fastening holes formed at opposite ends 622 and 624 thereof.

The rear mounting member 500 is located at the rear of the battery module array 600. The rear mounting member 500 is fastened to an external device (for example, a vehicle) through fastening holes 506 formed at opposite ends 502 and 504 thereof.

In addition, the first upper mounting members 610, the second upper mounting member 620, and the rear mounting member 500 are made of a hollow quadrangular bar formed in the shape of a quadrangular pipe in vertical section.

The front support member 400 and the rear support member 410 are formed in a rectangular shape when viewed from above. Each of the front and rear support members 400 and 410 includes a main body contacting a corresponding one of the outermost battery modules, an upper end wall and a lower end wall protruding outward from the outer circumference of the main body, and a pair of side walls.

In addition, the upper end wall of the front support member 400 is coupled to the first upper mounting members 610 by bolting.

A lower plate 710 is mounted to the lower parts of the lower end support members 740 in a state in which opposite ends of the lower plate 710 are coupled to the front support member 400 and the rear support member 410, respectively. The lower plate 710 extends to the rear of the rear mounting member 500 to secure a space through which a wire (not shown) extends.

In addition, the lower end support members 740 include four members to respectively support opposite lower ends of the battery modules 602 and 604.

The first upper mounting members 610 include two end members 612 and 614 respectively coupled to opposite upper ends of the battery module array 600 and one middle member 615 coupled to the middle of the battery module array 600. The end 616 of each of the first upper mounting members 610, at which each of the first upper mounting members 610 is fastened to the external device, is bent upward by the height of the second upper mounting member 620.

In addition, an upper plate 700 is mounted between the battery module array 600 and the first upper mounting members 610. The battery module array 600 is coupled to the upper plate 700 fixed to the lower ends of the first upper mounting members 610 such that the weight of the battery module array 600 is supported by the first upper mounting members 610.

Regions of the upper plate 700 corresponding to the first upper mounting members 610 are depressed.

A reinforcement bracket 720 is coupled to the upper ends of the first upper mounting members 610 in parallel to the second upper mounting member 620. A U-shaped bracket 730 configured to fix a safety plug (not shown) is mounted to the upper end of the middle member 615.

The rear mounting member 500 is configured to have a U-shaped frame structure in which the rear mounting member 500 surrounds opposite side surfaces and the bottom of a cooling fan (not shown) mounted at the rear of the battery module array 600.

In addition, the opposite ends 502 and 504 of the rear mounting member 500 are bent in parallel to the second upper mounting member 620. The fastening holes 506 are formed at the bent regions of the rear mounting member 500, thereby easily achieving coupling to the external device.

Figure 5:
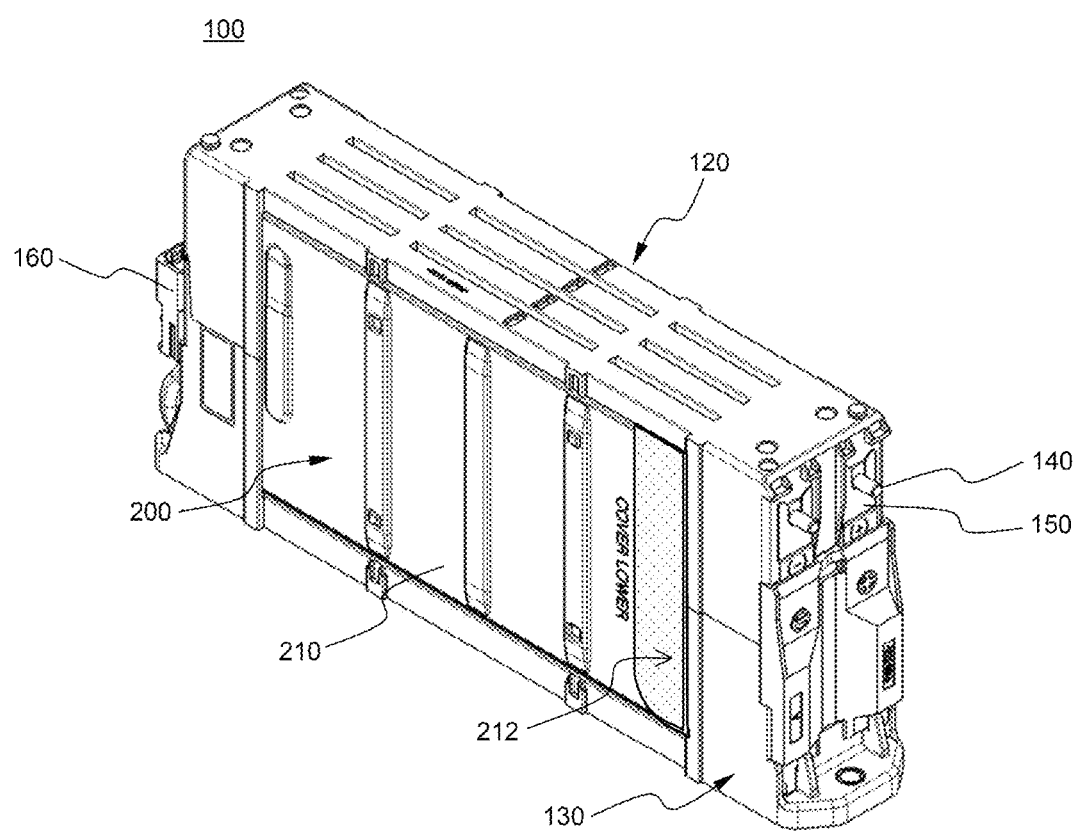
FIGS. 5 and 6 are perspective views showing a battery module used in the battery pack of FIG. 2.
Figure 6:
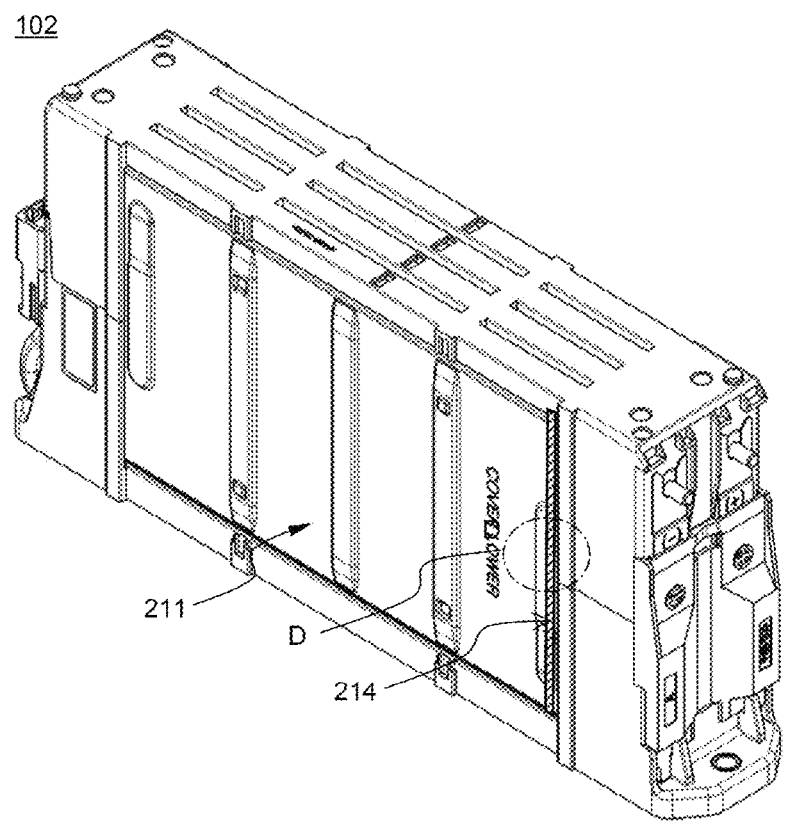

FIGS. 5 and 6 are perspective views typically showing a battery module used in the battery pack of FIG. 2.

Referring to FIG. 5, a battery module 100 is configured in a structure in which a unit module stack 200 is mounted between an upper case 120 and a lower case 130, which are assembled to each other, in a state in which the unit module stack 200 is erected in a lateral direction. Input and output terminals 140 are formed at the front of the upper case 120. Bus bars 150 for electrical connection with the input and output terminals 140 are formed at the front of the lower case 130. A connector 160 for connection of a voltage and temperature sensor is mounted at the rear of the lower case 130.

A cutout portion 212 is formed at one of cell covers of one outermost unit module 210 of the unit module stack 200. When a battery cell swells due to gas generated from the battery cell due to a short circuit or overcharge of the battery cell, therefore, local deformation of the battery cell may be induced by the cutout portion 212.

A battery module 102 of FIG. 6 is identical to the battery module 100 of FIG. 5 except that a notch portion 214 is formed at a region of one of cell covers of an outermost unit module 211 adjacent to an electrode terminal connection region in a straight shape and, therefore, a detailed description thereof will be omitted.

Figure 7:
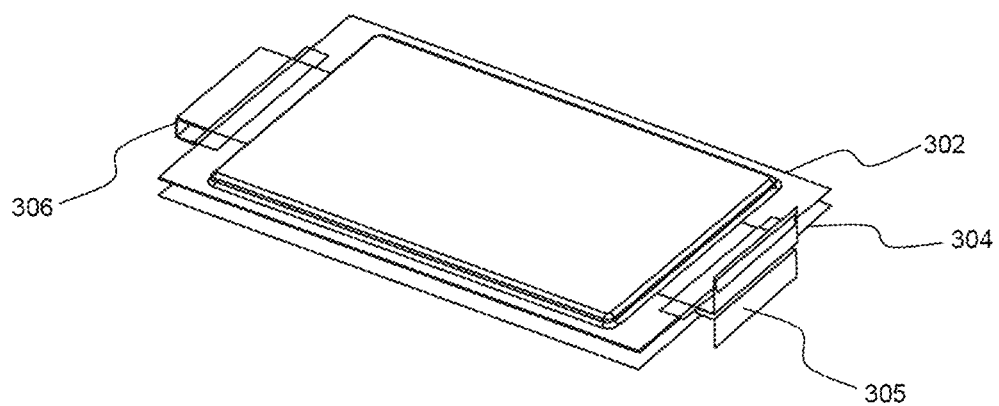
FIGS. 7 and 8 are perspective views respectively showing a pair of battery cells and cell covers constituting each unit module of the battery module of FIG. 5.
Figure 8:
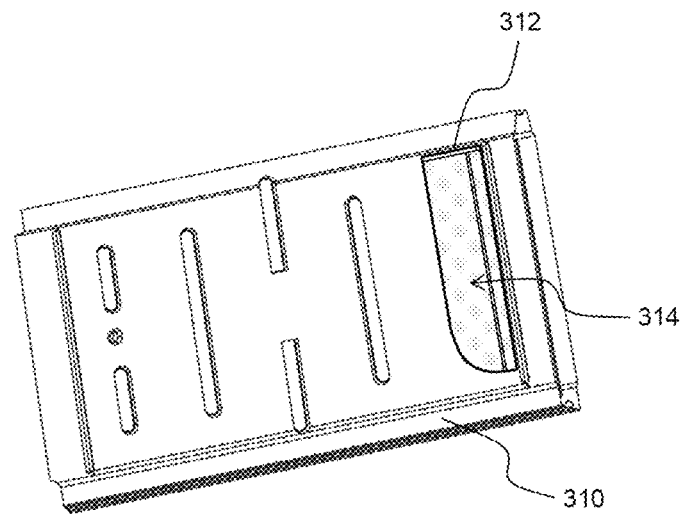

FIGS. 7 and 8 are perspective views typically showing a pair of battery cells and cell covers constituting each unit module of the battery module of FIG. 5.

Referring to these drawings, a unit module (not shown) is configured in a structure in which two battery cells 302 and 304 connected to each other in series are covered by high-strength cell covers 310 in a state in which electrode terminals 305 and 306 of the battery cells 302 and 304 are bent. The cell covers 310 are coupled to each other so as to cover outer surfaces of the battery cells 302 and 304 excluding the electrode terminals 305 and 306. A cutout portion 312 is formed at a region of one of the cell covers 310 adjacent to an electrode terminal connection region 314. The cutout portion 312 is formed by cutting out a portion of one of the cell covers 310. Upon swelling of the battery cells 302 and 304, therefore, the electrode terminal connection region 314 between the battery cells 302 and 304 extrudes and deformed through the cutout portion 312.

Figure 9:
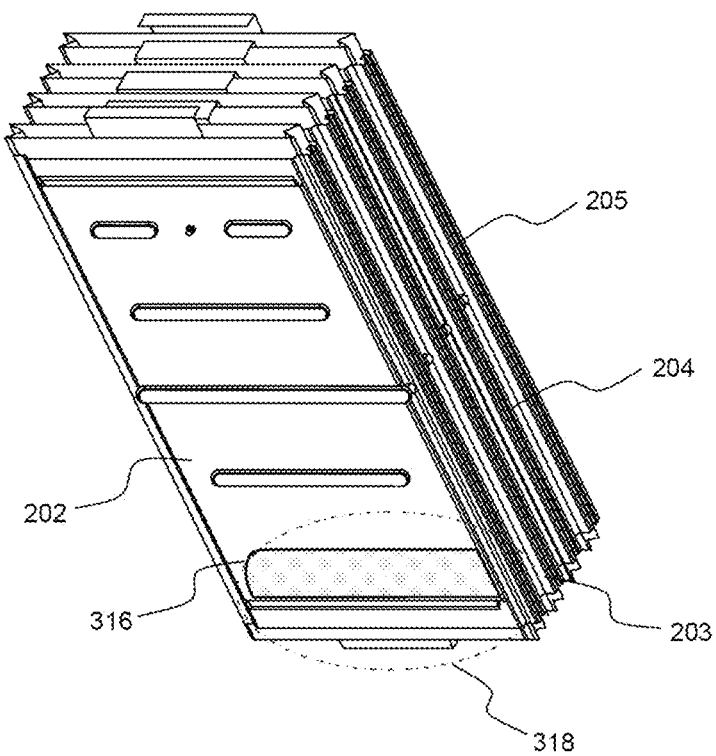
FIG. 9 is a perspective view showing a unit module stack.

FIG. 9 is a perspective view typically showing a unit module stack.

Referring to FIG. 9, a unit module stack 200 is configured to have a structure in which four unit modules 202, 203, 204, and 205, each of which includes battery cells covered by cell covers, are connected to each other in series in a state in which the unit modules are stacked in a zigzag fashion. A cutout portion 315 of a predetermined shape is formed at a region 318 of a corresponding one of cell covers to cover an outermost one of the unit modules 202, 203, 204, and 205, i.e. the unit module 202, adjacent to an electrode terminal connection region.

Figure 10:
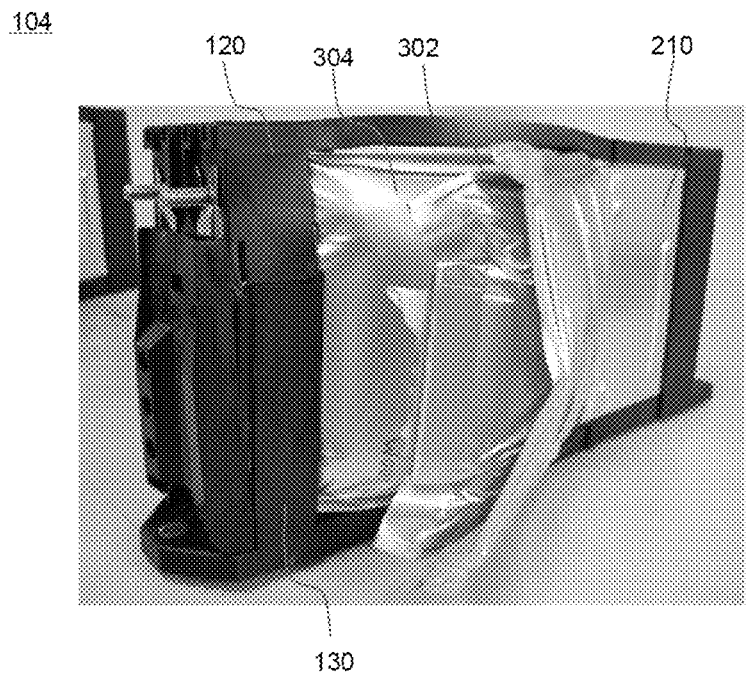
FIG. 10 is a picture of a battery module experiment showing a structure in which an electrode terminal ruptured due to swelling.

FIG. 10 is a picture of a battery module experiment showing a structure in which an electrode terminal ruptured due to swelling.

The inventors of the present application manufactured a battery module having the structure of FIG. 6 and carried out an overcharge test upon the manufactured battery module to confirm effects of the present invention. Results are shown in FIG. 10.

Referring to FIG. 10 together with FIG. 6, battery cells 302 and 304 swelled when a battery module 104 was overcharged. Expansion of the battery cells 302 and 304 due to such swelling was concentrated at the notch portion 214 partially formed at one of the cell covers of the outermost unit module 211. As a result, expansion of the battery cells 302 and 304 at the notch portion 214 was equivalent to approximately three times the thickness of a normal battery cell. Due to such expansion, an electrode terminal connection region between the battery cells 302 and 304 was ruptured with the result that series connection between the battery cells 302 and 304 was destroyed, thereby achieving interruption of electrical connection in the battery pack. Consequently, further charging did not occur.

For reference, the battery module 104 of FIG. 10 was manufactured in the same structure as the battery module 102 of FIG. 6 except that the cell cover structure of the outermost unit module 211 of the battery module 102 was applied to the cell covers of the outermost unit module disposed at the right side of the battery module.

Figure 11:
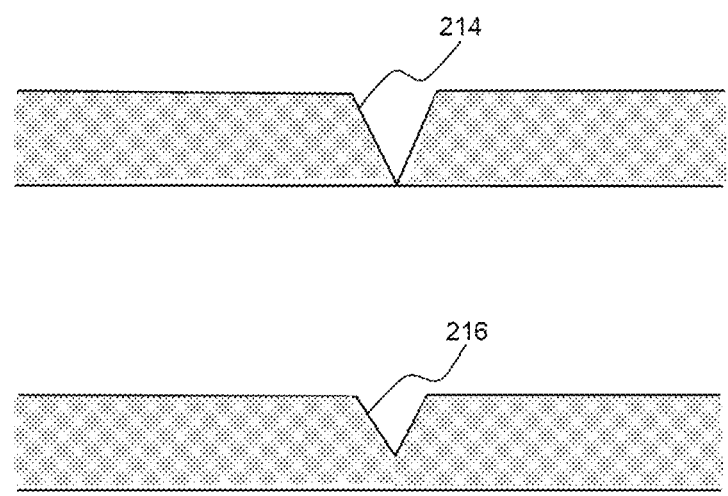
FIG. 11 is a vertical sectional view typically showing portion D of the battery module of FIG. 6.

FIG. 11 is a vertical sectional view typically showing portion D of the battery module of FIG. 6.

Referring to FIG. 11 together with FIG. 6, the notch portion may be configured to have a structure 214 in which a portion of the outermost unit module 211 is partially cut in a slit shape or a narrow and long groove structure 216 having a relatively small thickness.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery pack according to the present invention is configured such that weak portions having low resistance to volume expansion are formed at side support members. Consequently, when battery modules expand due to abnormal operation, such as overcharge, overdischarge, and overcurrent, of the battery modules or due to deterioration of the battery modules caused by charge and discharge of the battery modules for a long period of time, the weak portions are ruptured with the result that power supply is suspended, thereby greatly improving safety of the battery pack.

In addition, the middle or large-sized battery pack according to the present invention is configured to have a structure to interrupt electrical connection between the battery modules and a power switch unit independently of a battery management system (BMS). Consequently, it is possible to secure safety of the battery pack even when the BMS malfunctions or does not operate, thereby greatly improving reliability of the battery pack.

Furthermore, the battery modules are arranged in two or more rows. As compared with a conventional battery pack having one battery module, therefore, it is possible for the battery pack according to the present invention to supply electricity of high output and large capacity. In addition, first upper mounting members and a second upper mounting member are formed in the shape of a quadrangular pipe in vertical section. Consequently, it is possible to minimize deformation of the battery pack due to vibration and impact in a vertical direction.

In the battery pack according to the present invention, a portion of the structure of the battery pack is formed so as to correspond to a portion of a vehicle such that the battery pack is stably installed in the vehicle, thereby minimizing volume of the battery pack in the vehicle.

The invention claimed is:

1. A battery pack comprising:
   (a) a battery module array comprising battery modules configured to have a structure in which battery cells or unit modules, each of which has two or more battery cells mounted therein, are stacked in an inverted state, the battery modules being arranged in two or more rows;
   (b) a pair of side support members (a front support member and a rear support member) configured to respectively support a front and a rear of the battery module array in a state in which the side support members are in tight contact with outermost battery modules of the battery module array;
   (c) lower end support members coupled to lower ends of the side support members to support a lower end of the battery module array;
   (d) two or more first upper mounting members coupled to upper ends of the side support members and to lower ends of the inverted battery modules, one end of each of the first upper mounting members being fastened to an external device;
   (e) a second upper mounting member configured to vertically intersect the first upper mounting members, the second upper mounting member being coupled to upper ends of the first upper mounting members, opposite ends of the second upper mounting member being fastened to the external device; and
   (f) a rear mounting member located at a rear of the battery module array, opposite ends of the rear mounting member being fastened to the external device, wherein
   at least one of the side support members is partially provided with a weak portion exhibiting low resistance to volume expansion to induce local deformation of the battery modules upon occurrence of swelling, thereby achieving interruption of electrical connection in the battery pack.

2. The battery pack according to claim 1, wherein the weak portion is formed at at least one of the side support members per unit row of the battery modules.

3. The battery pack according to claim 2, wherein the weak portion comprises weak portions respectively formed on the front support member and the rear support member in a symmetrical fashion, weak portions formed on the front support member per unit row of the battery modules, or weak portions formed on the rear support member per unit row of the battery modules.

4. The battery pack according to claim 1, wherein the weak portion is formed at a region corresponding to or adjacent to a series connection region of a corresponding one of the outermost unit modules.

5. The battery pack according to claim 1, wherein the weak portion comprises a cutout portion through which a series connection region of a corresponding one of the outermost unit modules is opened.

6. The battery pack according to claim 5, wherein a region at which the cutout portion is formed has a size equivalent to 10 to 80% a surface area of each of the side support members.

7. The battery pack according to claim 1, wherein the battery modules are fixed to maintain a stacked state of the battery cells or the unit modules even when volume of the battery modules is changed during charge and discharge of the battery modules, expansion stress generated from the battery cells due to swelling of the battery cells is concentrated at an electrode terminal connection region between the battery cells or the unit modules, and the electrode terminal connection region is configured to have a structure having low resistance to volume expansion such that the electrode terminal connection region is ruptured when swelling exceeds a predetermined value, thereby achieving interruption of electrical connection in the battery pack.

8. The battery pack according to claim 7, wherein the battery cells or the unit modules are surrounded by a high-strength case and the electrode terminal connection region configured to be ruptured upon excessive swelling of the battery cells is partially opened or has a notch.

9. The battery pack according to claim 8, wherein
   each of the unit modules comprises: battery cells configured such that electrode terminals of the battery cells are connected to each other in series and a connection portion between the electrode terminals is bent such that the battery cells are stacked; and a pair of high-strength cell covers configured to be coupled to each other such that the cell covers can cover outer surfaces of the battery cells excluding the electrode terminals, and
   one of the cell covers is provided at a region thereof adjacent to the electrode terminal connection region with a cutout portion or a notch portion formed in a shape to induce local deformation of the battery cells during swelling.

10. The battery pack according to claim 9, wherein the cutout portion or the notch portion is formed at a corresponding one of the cell covers of each of the outermost unit modules.

11. The battery pack according to claim 10, wherein the cutout portion or the notch portion has a size set such that the electrode terminal connection region is ruptured when volume expansion corresponding to 1.5 to 5 times the thickness of each of the battery cells is caused by swelling of the battery cells.

12. The battery pack according to claim 11, wherein the notch portion is formed at a region of a corresponding one of the cell covers adjacent to the electrode terminal connection region in a straight shape.

13. The battery pack according to claim 1, wherein the first upper mounting members, the second upper mounting member, and the rear mounting member are formed in the shape of a quadrangular pipe in vertical section.

14. The battery pack according to claim 1, wherein each of the side support members comprises: a main body contacting a corresponding one of the outermost battery modules of the battery module array; an upper end wall and a lower end wall protruding outward from an outer circumference of the main body; and a pair of side walls.

15. The battery pack according to claim 1, wherein the side support members are formed in a rectangular shape when viewed from above.

16. The battery pack according to claim 1, further comprising a lower plate mounted to lower parts of the lower end support members in a state in which opposite ends of the lower plate are coupled to the side support members.

17. The battery pack according to claim 1, wherein the first upper mounting members comprise two end members respectively coupled to opposite ends of the battery module array and one middle member coupled to a middle of the battery module array.

18. The battery pack according to claim 1, wherein each of the first upper mounting members has one end at which each of the first upper mounting members is fastened to the external device, the end being bent upward by a height of the second upper mounting member.

19. The battery pack according to claim 1, further comprising an upper plate mounted between the battery module array and the first upper mounting members.

20. The battery pack according to claim 1, wherein the rear mounting member is configured to have a U-shaped frame structure in which the rear mounting member surrounds opposite side surfaces and a bottom of a cooling fan mounted at the rear of the battery module array.

21. The battery pack according to claim 1, wherein the opposite ends of the rear mounting member are bent in parallel to the second upper mounting member such that the rear mounting member is easily coupled to the external device, and the rear mounting member is provided at the bent regions thereof with fastening holes.

22. An electric vehicle, a hybrid electric vehicle, or a plug-in hybrid electric vehicle using a battery pack according to claim 1 as a power source.

23. The electric vehicle, the hybrid electric vehicle, or the plug-in hybrid electric vehicle according to claim 22, wherein the battery pack is installed in a lower end of a trunk of the vehicle or between a rear seat and the trunk of the vehicle.

* * * * *